(12) United States Patent
Motohashi

(10) Patent No.: US 6,483,622 B1
(45) Date of Patent: Nov. 19, 2002

(54) MOBILE DATA TERMINAL WITH AN INFRARED COMMUNICATION CAPABILITY

(75) Inventor: Teruyuki Motohashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/270,824

(22) Filed: Mar. 18, 1999

(30) Foreign Application Priority Data

Mar. 30, 1998 (JP) ............................................ 10-083261

(51) Int. Cl.$^7$ ............................................ H04B 10/00
(52) U.S. Cl. ........................ 359/172; 359/152; 379/56-3
(58) Field of Search ................................ 359/152, 172, 359/142; 455/13–4, 343; 379/56–3

(56) References Cited

U.S. PATENT DOCUMENTS

| | | | | |
|---|---|---|---|---|
| 5,075,792 A | * | 12/1991 | Brown et al. ................ | 359/152 |
| 5,343,319 A | * | 8/1994 | Moore ......................... | 359/152 |
| 5,440,559 A | * | 8/1995 | Gaskill .................. | 340/825.34 |
| 5,566,022 A | * | 10/1996 | Segev ......................... | 359/172 |
| 6,175,434 B1 | * | 1/2001 | Feng ........................... | 359/152 |

FOREIGN PATENT DOCUMENTS

| | | |
|---|---|---|
| JP | 55-67255 | 5/1980 |
| JP | 62-1446 | 1/1987 |
| JP | 63-131432 | 8/1988 |
| JP | 2-280427 | 11/1990 |
| JP | 4-58696 | 2/1992 |
| JP | 4-313182 | 11/1992 |
| JP | 5-55683 | 7/1993 |
| JP | 6-261381 | 9/1994 |
| JP | 7-66780 | 3/1995 |
| JP | 7-183853 | 7/1995 |
| JP | 9-167997 | 6/1997 |

OTHER PUBLICATIONS

Korean Office Action, dated Feb. 28, 2001, with English language translation of Korean Examiner's comments.
Japanese Office Action, dated Mar. 7, 2000, with English language translation of Japanese Examiner's comments.

* cited by examiner

Primary Examiner—Kinfe-Michael Negash
(74) Attorney, Agent, or Firm—Whitham, Curtis & Christofferson, P.C.

(57) ABSTRACT

In a mobile data terminal having an infrared communication capability, a battery capacity detection 4 determines whether or not the remaining capacity of a battery 5 is smaller than a preselected threshold value. If the remaining capacity is greater than the threshold value, a data processing 1 causes a drive current control 3 to feed a first preselected drive current to a light emitting device 21 included in an infrared communication function 2. If the remaining capacity is smaller than the threshold value, the data processing 1 causes the drive current control 3 to feed a second preselected drive current smaller than the first drive current to the light emitting device 21. As a result, when the remaining battery capacity is small, a distance which infrared rays reach is reduced in order to maintain the infrared communication capability. A decrease in the above distance is reported to the user of the data terminal via an output 8 for thereby insuring convenient use.

9 Claims, 6 Drawing Sheets

MOBILE DATA TERMINAL WITH AN INFRARED COMMUNICATION CAPABILITY

BACKGROUND OF THE INVENTION

1. Field of the Invention

The present invention relates to a mobile data terminal and more particularly to a mobile data terminal having an infrared communication capability.

2. Description of the Related Art

Mobile data terminals having an infrared communication capability are disclosed in, e.g., Japanese patent laid-open publication No. 4-313182, Japanese utility model laid-open publication No. 5-55683, and Japanese patent laid-open publication No. 9-167997. The data terminals taught in these documents (remote control system in laid-open publication No. 5-55683) each have an infrared communication function in addition to various conventional functions including a character input function, a data storage function, and a telephone directory function. With the infrared communication function, it is possible to interchange various data with another equipment by using infrared rays.

Generally, infrared communication needs a great current for driving a light emitting device. The current for driving the light emitting device is even greater than a current for executing a function other than the infrared communication function.

A mobile data terminal is rarely connected to a commercial power source and usually powered by a miniature battery mounted thereon. Therefore, infrared communication consuming a great current reduces the life of the battery. Moreover, when the remaining capacity of the battery is small, the data terminal practically fails to effect infrared communication.

SUMMARY OF THE INVENTION

It is therefore an object of the present invention to provide an improved mobile data terminal having an infrared communication capability.

It is another object of the present invention to provide a mobile data terminal capable of extending the duration of infrared communication available therewith.

It is a further object of the present invention to provide a mobile data terminal capable of controlling a drive current for an infrared light-emitting device in accordance with the remaining capacity of a battery.

In accordance with the present invention, a mobile data terminal having an infrared communication capability includes an infrared communication section for effecting infrared communication with another equipment, a drive controller for controllably driving the infrared communication section, and a starting section for starting the infrared communication. The drive controller controls, in response to a start of the infrared communication, a drive current to be fed to the infrared communication section.

Also, in accordance with the present invention, a mobile data terminal having an infrared communication capability includes an infrared communication section for effecting infrared communication with another equipment, a drive section for driving the infrared communication section, a starting section for starting the infrared communication, and a controller for controlling the drive section in response to a start of the infrared communication. The controller controls, in response to the start of the infrared communication, a distance which infrared rays to issue from the infrared communication section reach.

Further, in accordance with the present invention, a mobile data terminal having an infrared communication capability includes at least two infrared communication sections each for effecting infrared communication with another equipment, a drive section for driving the infrared communication sections, a starting section for starting the infrared communication, and a controller for controlling the drive section in response to a start of the infrared communication. The controller selects, in response to a start of the infrared communication, one of the infrared communication sections and causes it to effect the infrared communication.

BRIEF DESCRIPTION OF THE DRAWINGS

These and other objects, features and advantages of the present invention will become more fully apparent from the following detailed description taken with the accompanying drawings in which.

DESCRIPTION OF THE PREFERRED EMBODIMENTS

Figure 1:
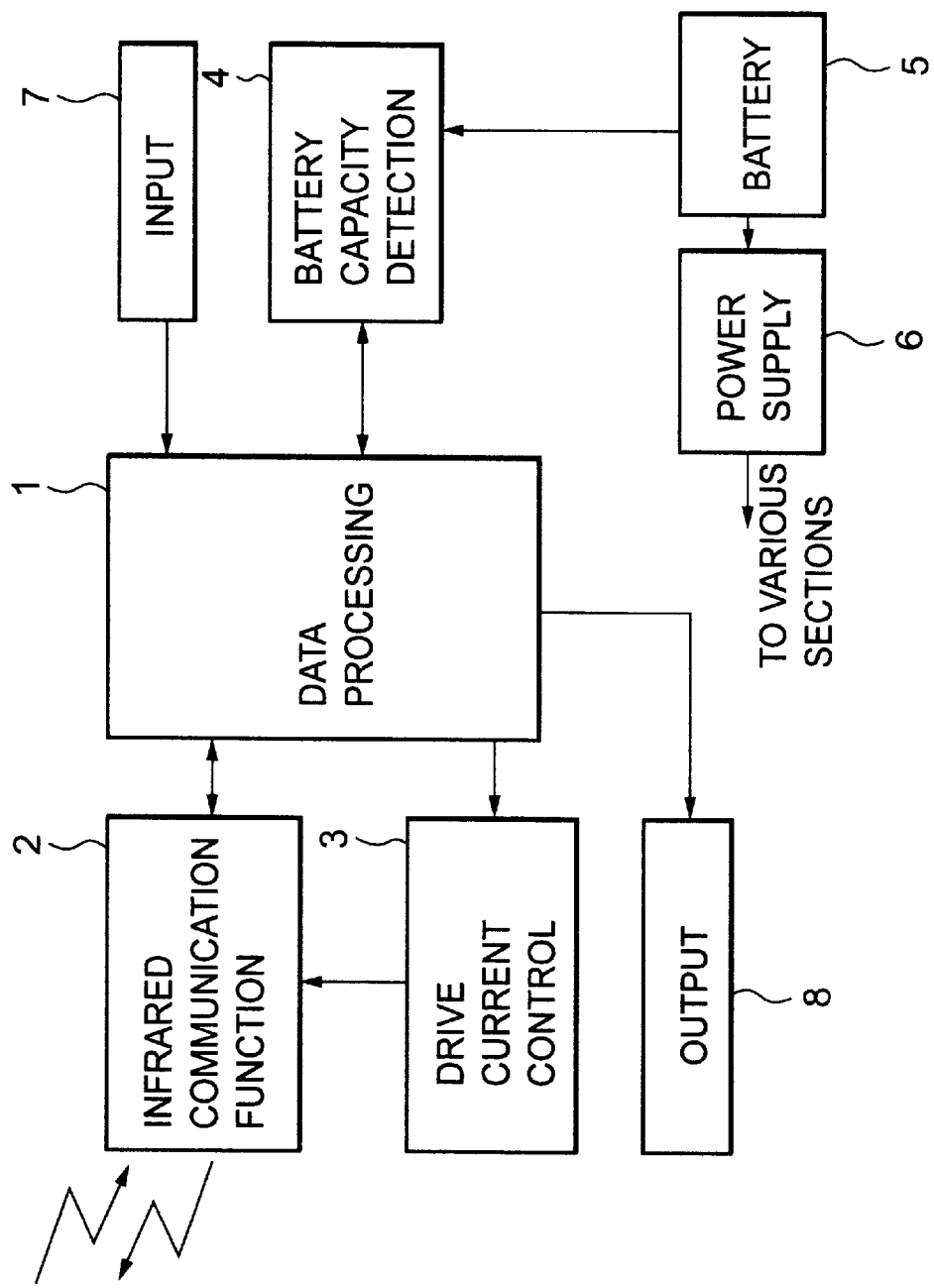
FIG. 1 is a block diagram schematically showing a mobile data terminal embodying the present invention.

Referring to FIG. 1 of the drawings, a mobile data terminal embodying the present invention is shown. As shown, the data terminal includes a data processing operable by program control for controlling various sections of the data terminal. An infrared communication function 2 sends data input from the data processing 1 to another equipment or inputs data received from another equipment to the data processing 1. A drive current control 3 controls, under the control of the data processing 1, a drive current to be fed to the infrared communication function 2.

A battery capacity detection 4 detects the remaining capacity of a battery 5. A power supply 6 feeds the voltage of the battery 5 to various sections while stabilizing it. An input 7 is operated by the user of the data terminal and may advantageously be implemented by a keyboard. An output 8 allows the user to recognize various information and may advantageously be implemented by an LCD (Liquid Crystal Display).

In operation, the drive current control 3 controls a drive current to be fed to the infrared communication function 2 in accordance with the remaining capacity of the battery 5 determined by the battery capacity detection 4. The drive current so controlled allows a range or distance for infrared communication to vary. Therefore, even when the remaining capacity of the battery 5 is small, infrared communication is implemented by reducing the communicable range. The out put 8 may inform the user of the fact that the communicable range is changed.

Figure 2:
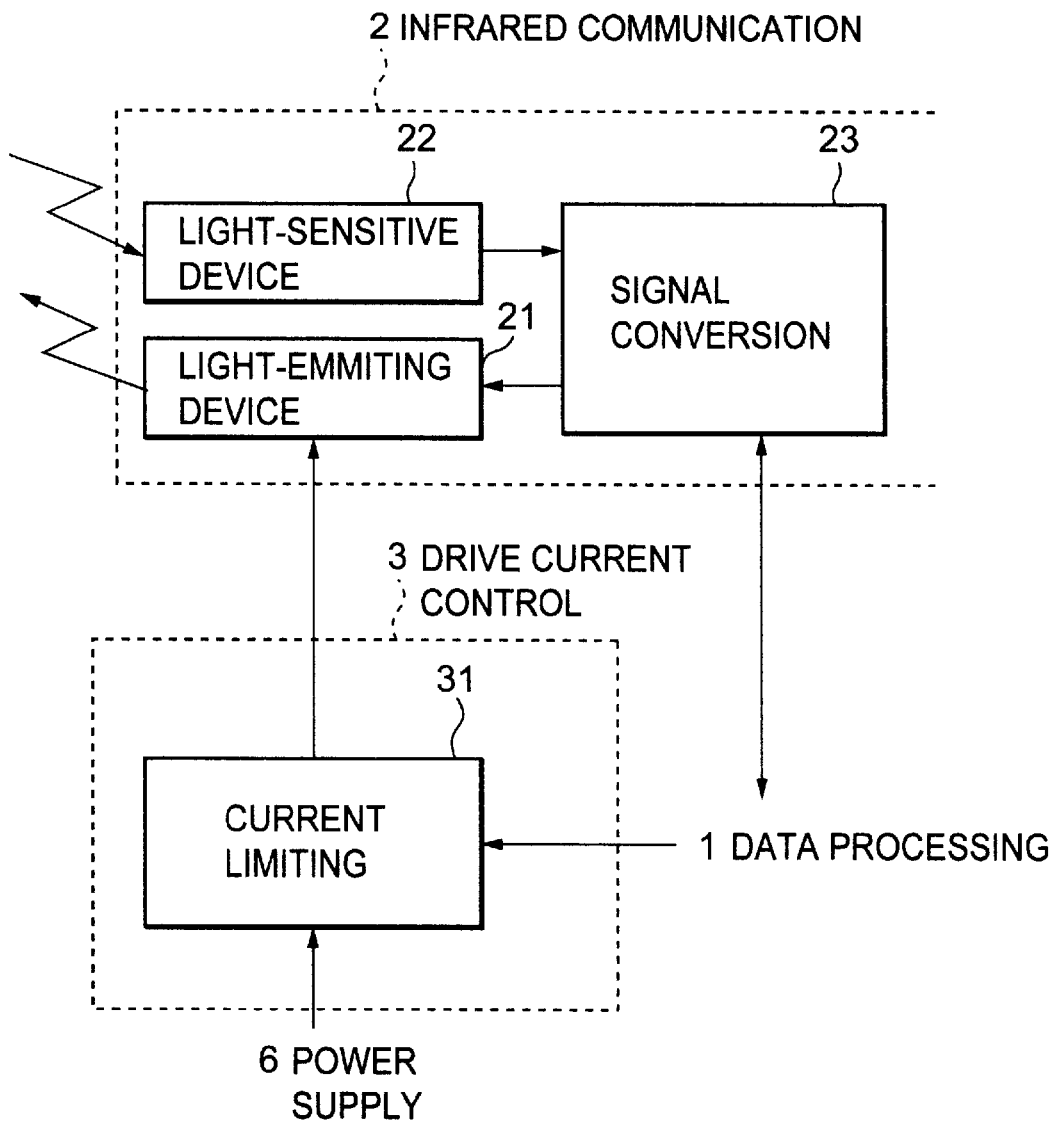
FIG. 2 shows a specific configuration of an infrared communication function and a specific configuration of a drive current control section included in the illustrative embodiment.

FIG. 2 shows a specific configuration of the infrared communication function 2 and a specific configuration of the drive current control 3. As shown, the infrared communication function 2 includes an infrared LED (Light Emitting Diode) or similar light emitting device 21 and a phototransistor or similar light-sensitive device 22. The light emitting device 21 emits an infrared signal while the light-sensitive device 22 receives an infrared signal. The device 21 additionally includes a signal conversion 23 for matching the signal level of the light transmitting device 21 and light-sensitive device 22 to the level of the data processing 1.

As also shown in FIG. 2, the drive current control 3 includes a current limiting 31 for varying the drive current for the light-emitting device 21 under the control of the data processing 1. The current limiting 31 should preferably be capable of setting at least two different current values.

Figure 3:
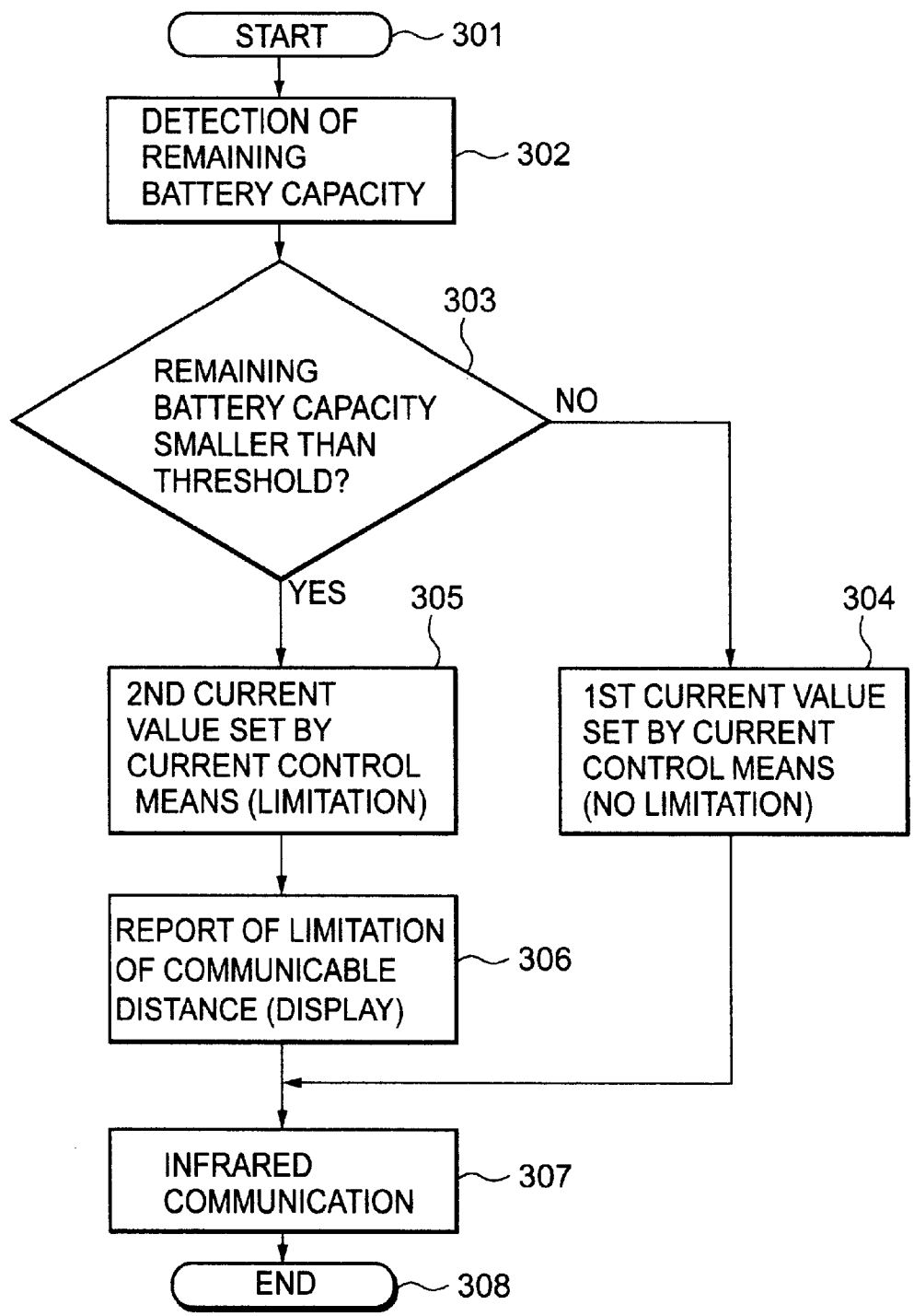
FIG. 3 is a flowchart demonstrating a specific operation of the illustrative embodiment.

When the remaining capacity of the battery 5 determined by the battery capacity detection 4 is lower than a preselected threshold value, the data processing 1 causes the current limiting 31 to limit the drive current to be fed to the light emitting device A specific operation of the illustrative embodiment will be described with reference to FIG. 3. First, the user operates the input 7 in order to input a command for causing the infrared communication function 2 to start operating (step S301). In response, the data processing 1 first causes the battery capacity detection 4 to detect the remaining capacity of the battery 5 (step S302). If the remaining capacity of the battery 5 is above the threshold value, i.e., if it is sufficient (NO, step S303), the data processing 1 causes the current limiting 31 of the drive current control 3 to set a first drive current value for the light emitting device 21 (step S304). The first drive current value does not limit the drive current for the light emitting device 21 and should therefore preferably be selected to maintain the communicable range greater than a preselected range.

The remaining capacity of the battery 5 and the threshold value may be compared by either one of the battery capacity detection 4 and data processing 1. The threshold value should preferably be one having no influence on infrared communication.

If the remaining capacity of the battery 5 is below the threshold value (YES, step 303), i.e., it is too small to effect usual infrared communication, then the data processing 1 causes the current limiting 31 to set a second drive current value for the light emitting device 21 (step S305). The second drive current value limits the drive current for the light emitting device 21 and is smaller than the first drive current value. With the second current value, it is possible to reduce the power consumption of the light emitting device 21 and to limit the distance which infrared rays to issue from the device 21 reach.

After the second drive current value has been set, the output 8 informs the user of the fact that the communicable range of the data terminal is limited (step S306). While this should preferably be done by an LCD, use may alternatively be made of an LED or a speaker. Of course, alerting the user to the above fact is not essential if it is not necessary to make the user recognize the reduced distance.

After the drive current for the light emitting device 21 has been set on the basis of the remaining capacity of the battery 5, infrared communication is executed (step S307). Then, the control procedure ends (step S308).

Figure 4:
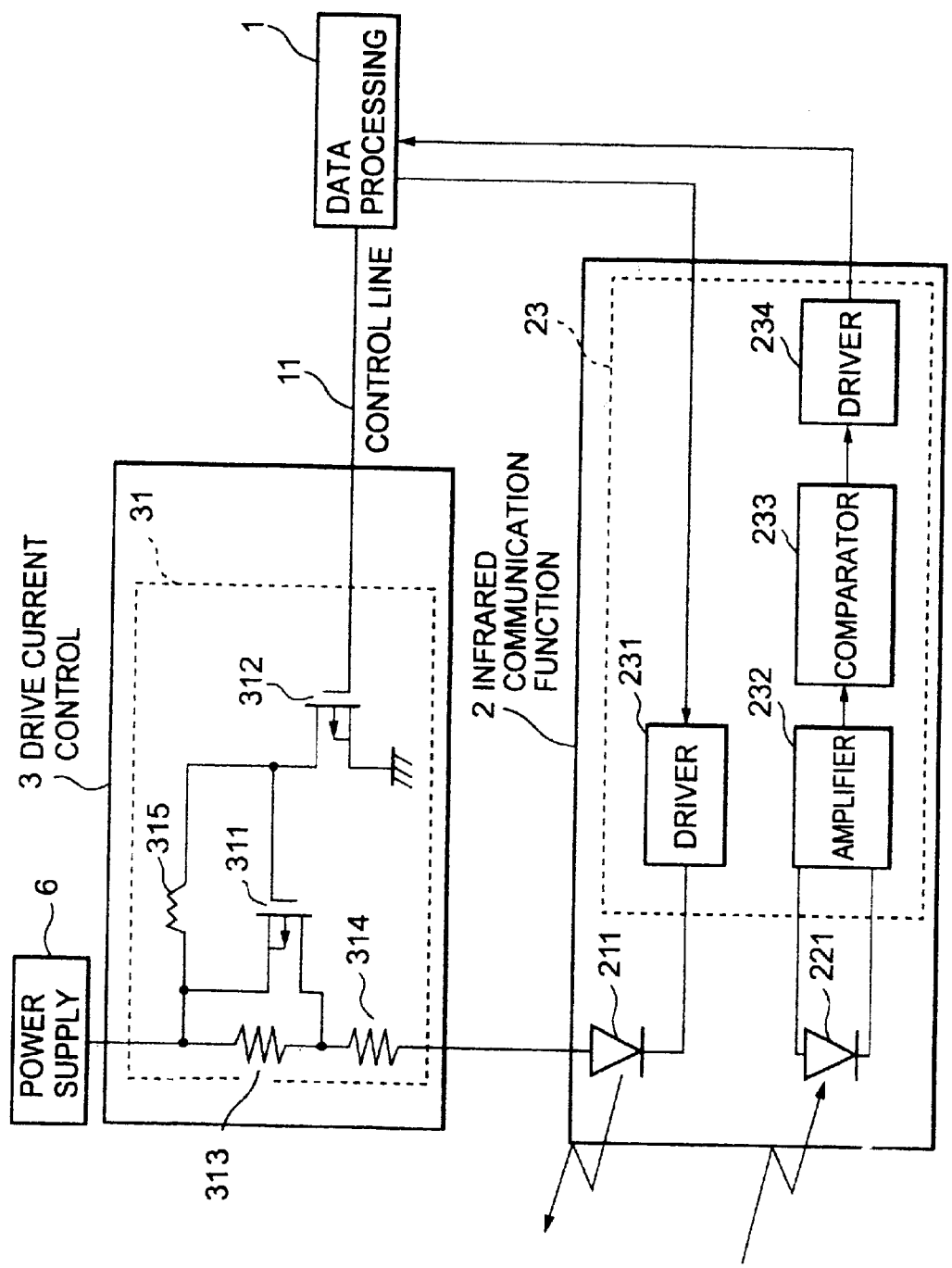
FIG. 4 shows the infrared communication function and drive current control section of FIG. 2 more specifically.

FIG. 4 shows the infrared communication function 2 and drive current control 3 more specifically. As shown, the infrared communication function 2 includes an infrared LED or light emitting device 211 and a photodiode or light-sensitive device 221. The signal conversion 23 includes a driver 231 for driving the LED 211. An amplifier 232 amplifies an electric signal output from the photodiode 221. A comparator 233 transforms an analog electric signal output from the amplifier 232 to a digital signal. A driver 234 matches the signal level of the infrared communication function 2 to the signal level of the data processing 1.

In the drive current control 3, the current limiting 31 includes current limiting resistors 313 and 314 for limiting the drive current for the infrared LED 211. An FET (Field Effect Transistor) 311 short-circuits the resistor 313 and is driven by another FET 312. The current limiting 31 additionally includes pull-up resistor 315.

The operation of the circuitry shown in FIG. 4 is as follows. When the remaining capacity of the battery 5, FIG. 1, is above the threshold value, i.e., it is sufficient, the data processing 1 feeds a signal of high level to the current limiting 31 via a control line 11. In response, the FET 312 and therefore the FET 311 turns on. As a result, opposite ends of the current limiting resistor 313 is short-circuited. In this condition, the drive current for the infrared LED 211 is determined by the resistance of the other current limiting resistor 314, so that the first drive current value is set.

On the other hand, when the remaining capacity of the battery 5 is below the threshold value, i.e., too small to effect usual infrared communication, the data processing 1 feeds a signal of low level to the current limiting 31 via the control line 11. In response, the FET 312 and therefore the FET 311 turns off. Consequently, the drive current for the LED 211 is determined by the sum of the resistances of the resistors 313 and 314, so that the second drive current value is set.

Assume that the battery 5 is implemented by a miniature lithium ion battery. Then, the capacity available with the battery 5 in a full state is 4 V while a voltage of 3.3 V is necessary for a mobile data terminal to operate. Also, the peak value of a drive current is, e.g., 500 mA for infrared communication or 300 mA for other functions. In these conditions, the control described above is practicable if the threshold is selected to be 3.4 V.

Figure 5:
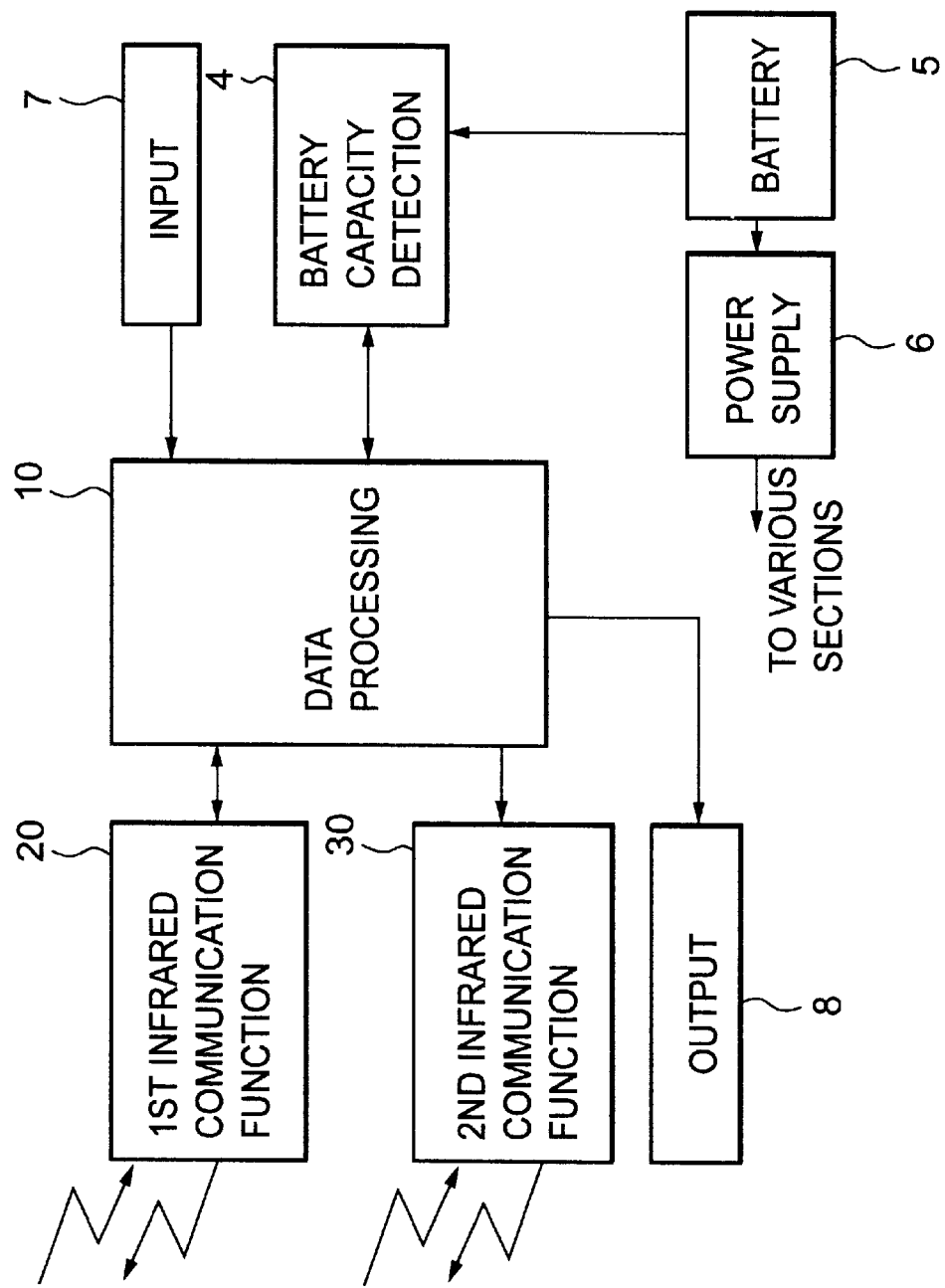
FIG. 5 is a schematic block diagram showing an alternative embodiment of the present invention.

Reference will be made to FIG. 5 for describing an alternative embodiment of the present invention. In FIG. 5, structural elements identical with the structural elements shown in FIG. 1 are designated by like reference numerals, and a detailed description will not be made in order to avoid redundancy. As shown, this embodiment differs from the previous embodiment in that it lacks the drive current control 3, includes two infrared communication functions 20 and 30, and includes a data processing 10 for controlling the infrared communication functions 20 and 30.

The infrared communication functions 20 and 30 each include a respective light-emitting device, although not shown specifically. A drive current assigned to the light emitting device of the function 30 is selected to be smaller than a drive current assigned to the light emitting device of the function 20.

Figure 6:
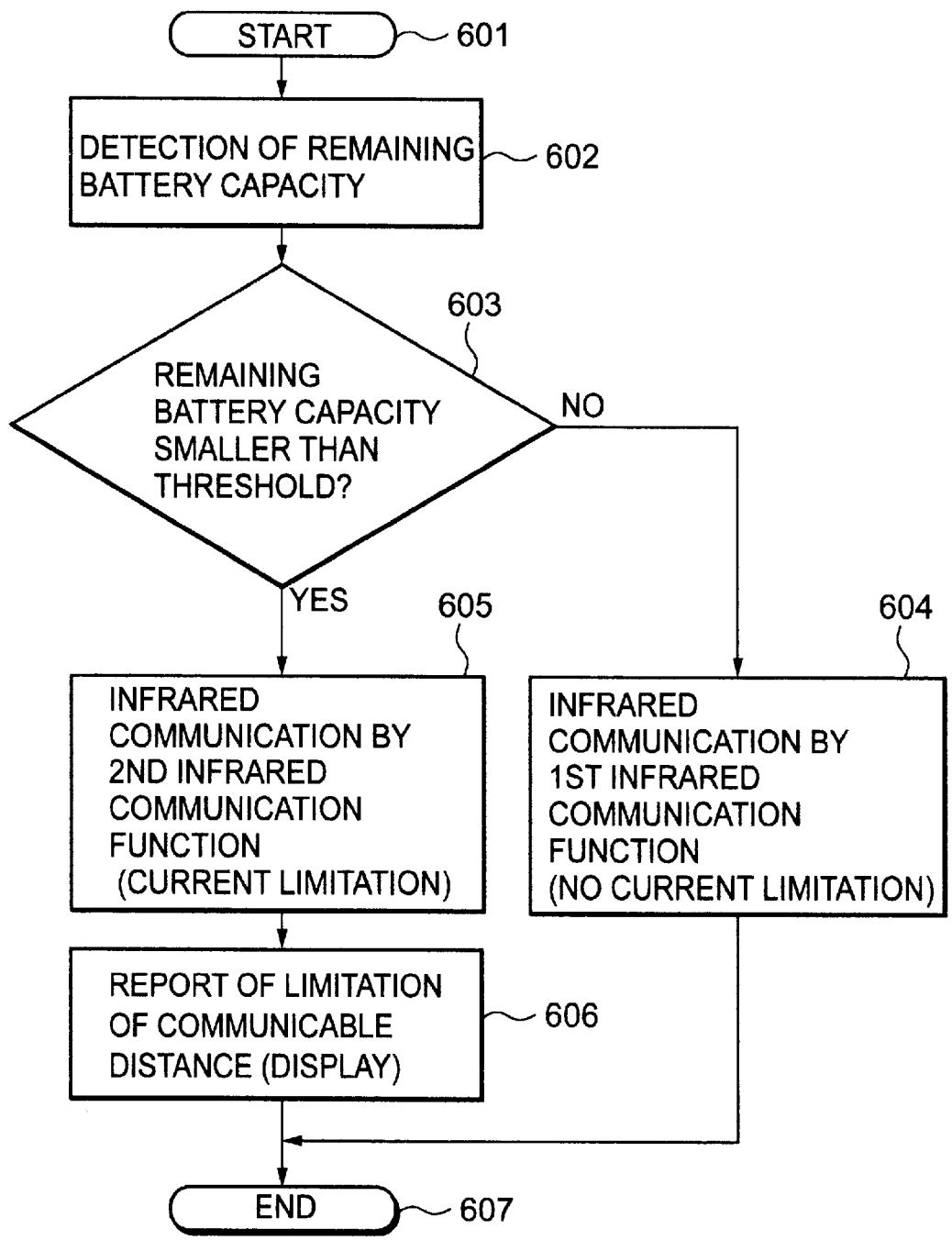
FIG. 6 is a flowchart showing a specific operation of the embodiment of FIG. 5.

A specific operation of this embodiment will be described with reference to FIG. 6. As shown, the user operates the input 7 in order to input a command for starting infrared communication (step S601). In response, the data processing 10 first causes the battery capacity detection 4 to detect the remaining capacity of the battery 5 (step S602). If the remaining capacity of the battery 5 is above the threshold value, i.e., if it is sufficient (NO, step S603), the data processing 10 selects the infrared communication function 20 and causes it to effect infrared communication (step S604). The drive current for the light emitting device of the infrared communication function is not limited.

If the remaining capacity of the battery 5 is below the threshold value (YES, step 603), i.e., it is too small to effect usual infrared communication, then the data processing 10 selects the other infrared communication function 30 and causes it to effect infrared communication (step S605). The drive current for the light emitting device of the infrared communication function 30 is limited. Subsequently, the output 8 informs the user of the fact that the communicable range for infrared communication is limited (step S607). Then, the control procedure ends (step S608).

In the illustrative embodiments shown and described, use is made of a single threshold value as to the remaining capacity of the battery 5, and two drive current values for the light-emitting device. If desired, two or more threshold values may be used in order to selectively drive the light emitting device with three or more drive current values.

While the above embodiments have concentrated on control over the drive current for a light emitting device, the present invention may, of course, be implemented as means for controlling any other infrared communicable range and thereby reducing power consumption.

In summary, it will be seen that the present invention provides a mobile data terminal capable of controlling a drive current for a light-emitting device in accordance with the remaining capacity of a battery and thereby performing infrared communication even when the battery capacity is lowered. Further, the data terminal is capable of selecting adequate one of two or more different drive current values in accordance with the remaining capacity of the battery, and thereby reducing power consumption and extending the life of the battery. In addition, when the data terminal limits the drive current, it informs the user of the data terminal of the limited communicable range and is therefore convenient to use.

While the invention has been described with reference to specific embodiments thereof, it will be appreciated by those skilled in the art that numerous variations, modifications and embodiments are possible, and accordingly all such variations, modifications and embodiments are to be regarded as being within the spirit and scope of the invention.

What is claimed is:

1. A mobile data terminal having an infrared communication capability, comprising:
   infrared communication means for effecting infrared communication with another equipment;
   power supply means for feeding a power supply voltage to said drive control means;
   detection means for detecting a remaining power capacity of said power supply means;
   drive control means responsive to said detection means for controllably driving said infrared communication means; and
   starting means for starting the infrared communication,
   said drive control means controlling, in response to a start of the infrared communication, a drive current to be fed to said infrared communication means in accordance with a remaining capacity of said power supply means.

2. A mobile data terminal as claimed in claim 1, further comprising power supply means for feeding a power supply voltage to said drive control means, said drive control means selecting the drive current in accordance with a remaining capacity of said power supply means.

3. A mobile data terminal as claimed in claim 1, wherein said drive control means limits the drive current when the remaining capacity is smaller than a preselected threshold value.

4. A mobile data terminal as claimed in claim 3, wherein the drive current drives a light emitting device included in said infrared communication means.

5. A mobile data terminal as claimed in claim 3, wherein said drive control means limits the drive current when the remaining capacity is smaller than a preselected threshold value.

6. A mobile data terminal having an infrared communication capability, comprising:
   infrared communication means for effecting infrared communication with another equipment;
   driving means for driving said infrared communication means;
   starting means for starting the infrared the infrared communications;
   power supply means for feeding a poer supply voltage to said drive means;
   detection means for detecting a remaining power capacity of the power supply means; and
   control means responsive to said detection means for controlling said drive means in response to a start of the infrared communication,
   said control means controlling, in response to the start of the infrared communication, a distance which infrared rays to issue from said infrared communication means reach and, when a remaining capacity of said power supply means is smaller than a capacity for said infrared communication means to effect the infrared communication, said control means controlling said drive means such that the distance decreases.

7. A mobile data terminal as claimed in claim 6, wherein said control means effects the infrared communication after so controlling said drive means as to reduce the distance.

8. A mobile data terminal as claimed in claim 6, wherein said control means informs, when so controlling said drive means as to reduce the distance, a user of said mobile data terminal of a decrease in the distance.

9. A mobile data terminal having an infrared communication capability, comprising:
   at least two infrared communication means each for effecting infrared communication with another equipment;
   drive means for starting the infrared communication;
   power supply means for feeding a power supply voltage to said drive means;
   detection means for detecting a remaining power capacity of the power supply means; and
   control means responsive to said detection means for controlling said drive means in response to a start of the infrared communication,
   said control means selecting, in response to a start of the infrared communication and in accordance with the remaining power capacity of said power supply means, one of said at least two infrared communication means and causing the one infrared communication means to effect the infrared communication.

* * * * *